United States Patent
Chang et al.

(10) Patent No.: US 10,341,635 B2
(45) Date of Patent: Jul. 2, 2019

(54) STEREOSCOPIC IMAGING METHOD AND DEVICE

(71) Applicant: NATIONAL CHIAO TUNG UNIVERSITY, Hsinchu (TW)

(72) Inventors: Tian-Sheuan Chang, Hsinchu (TW); Yi-Chun Chen, Hsinchu (TW); Jen-Hui Chuang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 15/980,535

(22) Filed: May 15, 2018

(65) Prior Publication Data

US 2018/0338133 A1 Nov. 22, 2018

(30) Foreign Application Priority Data

May 17, 2017 (TW) .............. 106116269 A

(51) Int. Cl.
*H04N 13/128* (2018.01)
*H04N 13/383* (2018.01)
*H04N 13/117* (2018.01)
*H04N 5/44* (2011.01)
*H04N 13/398* (2018.01)

(52) U.S. Cl.
CPC ......... *H04N 13/128* (2018.05); *H04N 5/4403* (2013.01); *H04N 13/117* (2018.05); *H04N 13/383* (2018.05); *H04N 13/398* (2018.05)

(58) Field of Classification Search
USPC ...................................... 348/51
See application file for complete search history.

(56) References Cited

U.S. PATENT DOCUMENTS

| | | | |
|---|---|---|---|
| 8,094,927 B2 | 1/2012 | Jin et al. | |
| 8,711,204 B2 | 4/2014 | Smolic et al. | |
| 9,041,709 B2 | 5/2015 | Bruls et al. | |
| 9,118,911 B2 | 8/2015 | Lambert et al. | |
| 2010/0239240 A1* | 9/2010 | Cameron | G03B 35/00 396/325 |

(Continued)

OTHER PUBLICATIONS

S. Reichelt, R. Hussler, G. Ftterer, and N. Leister, "Depth cues in human visual perception and their realization in 3D displays," in Proc. Three-Dimensional Imaging, Visualization, and Display 2010 and Display Technologies and Applications for Defense, Security, and Avionics IV, Orlando, FL, Apr. 2010.

(Continued)

*Primary Examiner* — Behrooz M Senfi
(74) *Attorney, Agent, or Firm* — Michael Best & Friedrich LLP

(57) ABSTRACT

A stereoscopic imaging method includes: acquiring a convergence disparity value, which corresponds to a screen position at which a viewer is looking, from an original disparity map corresponding to first and second images that correspond to different viewing angles; generating a disparity transformation model based on the convergence disparity value and viewer-related information; transforming the original disparity map into a transformed disparity map based on the disparity transformation model; and synthesizing the first and second images into a stereoscopic image based on the transformed disparity map.

16 Claims, 2 Drawing Sheets

(56) References Cited

U.S. PATENT DOCUMENTS

| | | | | |
|---|---|---|---|---|
| 2013/0016187 A1* | 1/2013 | Zhang | ............... | H04N 13/128 |
| | | | | 348/47 |
| 2013/0250062 A1* | 9/2013 | Tin | ............... | G06T 7/85 |
| | | | | 348/46 |
| 2014/0132742 A1* | 5/2014 | Liu | ............... | H04N 13/128 |
| | | | | 348/51 |
| 2014/0254917 A1* | 9/2014 | Cheng | ............... | G06T 15/00 |
| | | | | 382/154 |

OTHER PUBLICATIONS

M. Lang et al., "Nonlinear disparity mapping for stereoscopic 3D," ACM Trans. Graph., vol. 29, No. 4, Jul. 2010.

H.-S. Lin, S.-H. Guan, C.-T. Lee, and M. Ouhyoung, "Stereoscopic 3D experience optimization using cropping and warping," in Proc. ACM.

M. Reddy, "Perceptually Optimized 3D Graphics," IEEE Computer Graphics and Applications, vol. 21, No. 5, pp. 68-75, Sep./Oct. 2001.

S.-W. Jung and S.-J. Ko, "Depth sensation enhancement using the just noticeable depth difference," IEEE Trans. Image Process., vol. 21, No. 8, pp. 3624-3637, Aug. 2012.

* cited by examiner

STEREOSCOPIC IMAGING METHOD AND DEVICE

CROSS-REFERENCE TO RELATED APPLICATION

This application claims priority of Taiwanese Patent Application No. 106116269, filed on May 17, 2017.

FIELD

The disclosure relates to an imaging method, and more particularly to a stereoscopic imaging method and device.

BACKGROUND

A conventional stereoscopic imaging technique uses a stereoscopic display to provide a left-eye image and a right-eye image to the left and right eyes of a viewer, respectively, to create three-dimensional (3D) illusion for the viewer based on horizontal disparity between the eyes of the viewer. However, such technique may cause headache and fatigue of the eyes due to an excessively large disparity between the images viewed by the left and right eyes.

In order to alleviate the abovementioned undesired symptom and achieve better viewing experience, some conventional techniques focus on adjustment of the disparity. For instance, sensitivity of the human eyes to depth information may be further considered to set an upper limit and a lower limit of the disparity on a basis of converging ability of the viewer's eyes, to enhance the depth sensation within a predetermined disparity range, or to emphasize 3D sensation of a specific region by removing/weakening some information of scenes that may adversely affect the depth sensation.

However, since the visual optimization of these conventional techniques is performed in advance and are not adjustable in real time based on the viewer's changeable viewing behavior, the expected optimization effect may not be achieved when the viewing behavior fails to conform with a prescribed condition for which the optimization would be effective (e.g., a position on a display screen at which the viewer is looking falls outside of the designed range of the optimization algorithm).

SUMMARY

Therefore, an object of the disclosure is to provide a stereoscopic imaging method that can generate a stereoscopic image based on a screen position at which a viewer is looking.

According to the disclosure, a stereoscopic imaging method is proposed for generating a stereoscopic image on a display screen for a viewer based on a pair of a first image and a second image that respectively correspond to different viewing angles. The stereoscopic imaging method includes: acquiring viewer-related information that includes a pupil distance between pupils of the viewer, a first parameter associated with a negative disparity condition, and a second parameter associated with a positive disparity condition; upon receipt of positional information associated with a convergence position on the display screen at which the viewer is looking, acquiring, by a processor based on the positional information, a convergence disparity value from an original disparity map that corresponds to the first and second images, the convergence disparity value corresponding to a pixel of the display screen at the convergence position; generating a disparity transformation model by the processor based on at least the convergence disparity value and the viewer-related information; transforming, by the processor, the original disparity map into a transformed disparity map based on the disparity transformation model; and synthesizing, by the processor, the first image and the second image into the stereoscopic image based on the transformed disparity map.

According to the disclosure, a stereoscopic imaging device is proposed for generating, for a viewer, a stereoscopic image on a display screen that has a plurality of pixels arranged at a pixel density. The stereoscopic imaging device includes a storage device and a processor. The storage device stores a pair of a first image and a second image that respectively correspond to different viewing angles, an original disparity map that corresponds to the first and second images and that has a plurality of disparity values corresponding respectively to the pixels of the display screen, and information of the pixel density of the display screen. The processor is coupled to the storage device for acquiring therefrom the first image, the second image, the original disparity map, and the information of the pixel density of the display screen, is disposed to receive positional information associated with a convergence position on the display screen at which the viewer is looking, and viewer-related information that includes a pupil distance between pupils of the viewer, a first parameter associated with a negative disparity condition, and a second parameter associated with a positive disparity condition, and is configured to acquire, upon receipt of the positional information, a convergence disparity value from the original disparity map based on the positional information, where the convergence disparity value corresponds to one of the pixels of the display screen at the convergence position. The processor is further configured to generate a disparity transformation model based on at least the convergence disparity value and the viewer-related information, to transform the original disparity map into a transformed disparity map based on the disparity transformation model, and to synthesize the first image and the second image into the stereoscopic image based on the transformed disparity map.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
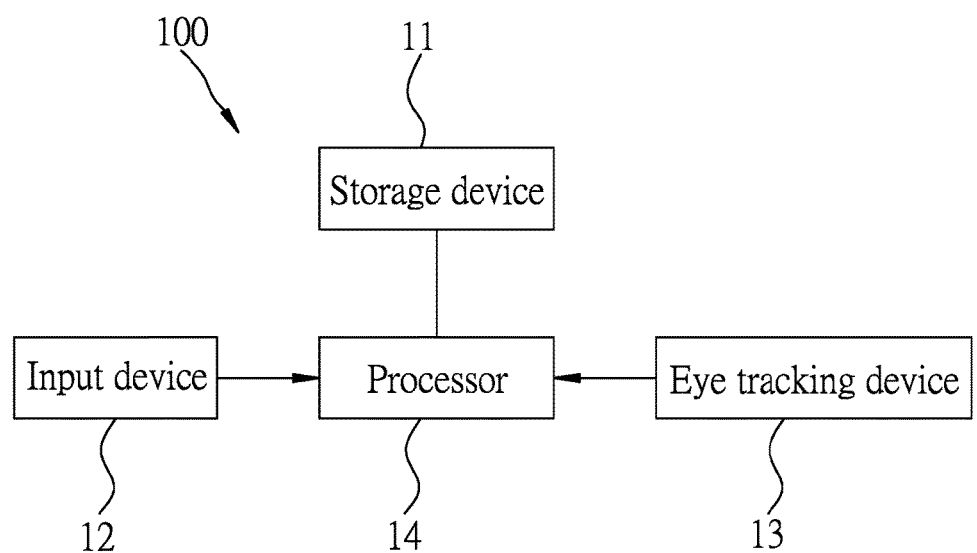
FIG. 1 is a block diagram illustrating an embodiment of the stereoscopic imaging device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, the embodiment of the stereoscopic imaging device 100 according to this disclosure includes a storage device 11 (e.g., a flash memory, a hard disk drive, a random access memory, etc.), an input device 12 (e.g., a remote controller, a keyboard, a touch screen, a computer mouse, etc.), an eye tracking device 13 (e.g., an eye tracker), and a processor 14.

In this embodiment, the storage device 11 may store a plurality of first images that correspond to a first viewing angle, a plurality of second images that correspond to a second viewing angle which is different from the first viewing angle, a plurality original disparity maps, and information of a pixel density of a display screen (not shown) that is configured to display thereon a stereoscopic image generated by the stereoscopic imaging device 100. The second images respectively correspond to the first images in terms of image content and time to be displayed, and each of the second images and the corresponding first image form an image pair. Each original disparity map corresponds to a corresponding image pair. The pixel density is associated with a number of pixels per unit area of the display screen, and is usually represented in terms of PPI (pixels per inch), but this disclosure is not limited in this respect. In this embodiment, the first viewing angle is exemplified to be a viewing angle for the left eye of the viewer, and the second viewing angle is exemplified to be a viewing angle for the right eye of the viewer. Each original disparity map includes a plurality of disparity values respectively corresponding to the pixels of the display screen, and is acquired based on a first disparity image associated with the corresponding first image, and a second disparity image associated with the corresponding second image. The first disparity image includes a plurality of first disparity pixel values respectively corresponding to image pixels of the corresponding first image (also, the pixels of the display screen), and the second disparity image includes a plurality of second disparity pixel values respectively corresponding to the image pixels of the corresponding second image (also, the pixels of the display screen). Each disparity value of the original disparity map may be acquired based on a corresponding one of the first disparity pixel values, a corresponding one of the second disparity pixel values, or an average of the corresponding first and second disparity pixel values, etc., which should be familiar to persons skilled in the art, so details thereof are omitted herein for the sake of brevity.

The input device 12 is configured to generate data, such as a first parameter ($C_{min}$) and a second parameter ($C_{max}$), in response to an input operation performed thereon by the viewer. In this embodiment, the first parameter ($C_{min}$) is viewer-defined and is used to set a criterion of $D_{viewer}/D_{object} < C_{min} < -1$ so as to achieve a desired 3D sensation for a virtual 3D object of the stereoscopic image formed in a negative disparity condition (a condition that the virtual 3D object is formed in front of the display screen with respect to the viewer, i.e., between the viewer and the display screen), and the second parameter ($C_{max}$) is user-defined and is used to set a criterion of $D_{viewer}/D_{object} > C_{max}$ to achieve a desired 3D sensation for a virtual 3D object of the stereoscopic image formed in a positive disparity condition (a condition that the virtual 3D object is formed behind the display screen with respect to the viewer), where $D_{viewer}$ is a viewer distance representing a distance between the viewer and the display screen, and $D_{object}$ is an object distance representing a distance between the virtual 3D object and the display screen, which is defined to be positive in the positive disparity condition, and negative in the negative disparity condition. In other words, when the viewer distance is fixed, the first/second parameter defines a maximum object distance to achieve the desired 3D sensation for the virtual 3D object of the stereoscopic image formed in the negative/positive disparity condition.

The eye tracking device 13 is used to estimate a pupil distance between the pupils of the viewer, and to detect movements of the eyeballs of the viewer to generate positional information associated with a convergence position on the display screen at which the viewer is looking.

The processor 14 is electrically coupled to the storage device 11, the input device 12 and the eye tracking device 13 to receive data therefrom.

It should be noted that, in some embodiments, the input device 12 may be omitted from the stereoscopic imaging device 100, and the storage device 11 further stores the first parameter and the second parameter; in some embodiments, the eye tracking device 13 may be omitted from the stereoscopic imaging device 100, and the input device 12 further generates data that indicates the pupil distance and the positional information in response to input operations performed thereon by the viewer; and in some embodiments, the eye tracking device 13 is configured to detect rotation angles of the eyeballs of the viewer, and the processor 14 generates/calculates the positional information based on the detected rotation angles of the eyeballs.

Figure 2:
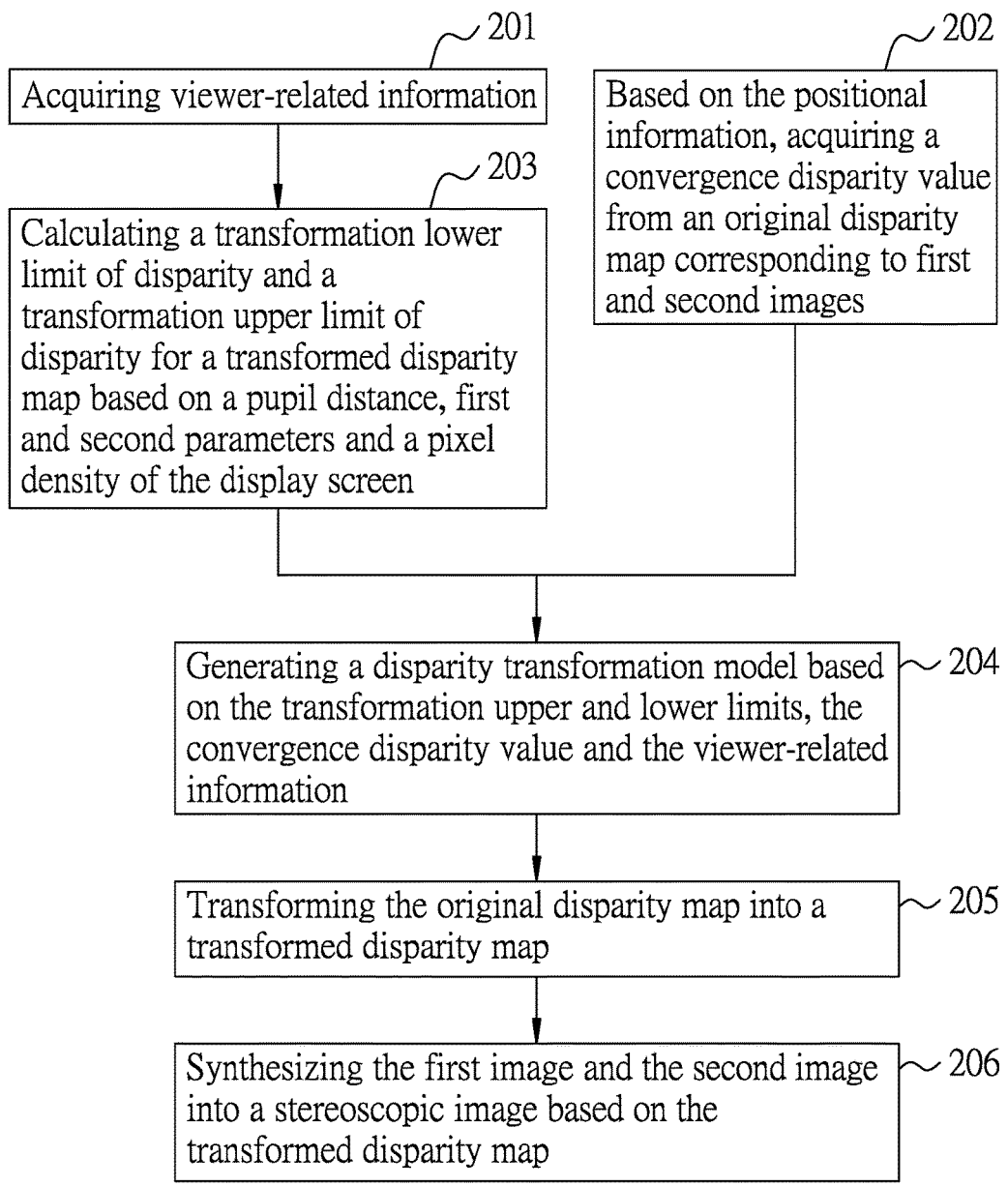
FIG. 2 is a flow chart illustrating an embodiment of the stereoscopic imaging method according to the disclosure.

Referring to FIGS. 1 and 2, the stereoscopic imaging device 100 generates the stereoscopic image on the display screen for the viewer according to the following steps 201 to 206, which are exemplified to generate a stereoscopic image based on an image pair including one first image and one second image that correspond to each other, and which may be applied to multiple image pairs to generate a plurality of corresponding stereoscopic images.

In step 201, the processor 14 acquires viewer-related information that includes the pupil distance, the first parameter and the second parameter. In this embodiment, the pupil distance is acquired from the eye tracking device 13, and the first and second parameters are acquired from the input device 12, but this disclosure is not limited in this respect.

In step 202, upon receipt of the positional information, the processor 14 acquires a convergence disparity value based on the positional information from an original disparity map corresponding to the first image and the second image. The convergence disparity value is one of the disparity values in the original disparity map that corresponds to a pixel of the display screen at the convergence position.

It is noted that, in the embodiments that do not include the input device 12, the processor 14 may acquire the first and second parameters from the storage device 11 in step 201; in the embodiments that do not include the eye tracking device 13, the processor 14 may acquire the pupil distance, the first parameter and the second parameter from the input device 12 in step 201, and acquire the positional information from the input device 12 in step 202.

In step 203, the processor 14 calculates a transformation lower limit of disparity for a transformed disparity map (that will be generated in the follow steps) based on the pupil distance, the first parameter, and a pixel density of the display screen, and calculates a transformation upper limit of disparity for the transformed disparity map based on the pupil distance, the second parameter, and the pixel density of the display screen. In this embodiment, the transformation lower limit and the transformation upper limit of disparity are calculated according to:

$$d_{min} = -(D_{eye} \times PPI)/(C_{min}+1); \text{ and} \qquad \text{i.}$$

$$d_{max} = (D_{eye} \times PPI)/(C_{max}+1); \qquad \text{ii.}$$

where $d_{min}$ represents the transformation lower limit of disparity, $d_{max}$ represents the transformation upper limit of disparity, $D_{eye}$ represents the pupil distance, PPI represents the pixel density, $C_{min}$ represents the first parameter, and $C_{max}$ represents the second parameter.

It is noted that steps 202 and 203 are not necessarily performed in sequence. That is, step 203 may be performed after step 202, before step 202, or simultaneously with step 202.

In step 204, the processor 14 generates a disparity transformation model based on the transformation upper limit, the transformation lower limit, the convergence disparity value and the viewer-related information. In this embodiment, the disparity transformation model is generated to be $$T(d)=0.5\times\{1+\text{erf}[(d-d_f)/(\sigma\sqrt{2})]\}\times(d_{max}-d_{min})+d_{min},$$
and a. $d_{min}^{NT} < d < d_{max}^{NT}$, where d represents an arbitrary one of a plurality of disparity values in the original disparity map, $d_{min}^{NT}$ represents a lower limit for the disparity values in the original disparity map, $d_{max}^{NT}$ represents an upper limit for the disparity values in the original disparity map, $d_f$ represents the convergence disparity value, erf[.] represents an error function, σ represents a standard deviation of the disparity values in the original disparity map, and T(d) is a transformation function to transform each of the disparity values in the original disparity map into a respective transformed disparity value in the transformed disparity map.

In another embodiment, the disparity transformation model may be generated further based on the upper limit and the lower limit for the disparity values in the original disparity map. The disparity transformation model can be derived as:

$$T(d_s)=A_s\times d_s\times(d_{max}-d_{min})/(d_{max}^{NT}-d_{min}^{NT})+d_{min},$$
where $d_f-S < d_s < d_f+S$; and $$T(d_{ns})=A_{ns}\times d_{ns}\times(d_{max}-d_{min})/(d_{max}^{NT}-d_{min}^{NT})+d_{min},$$
where $d_{ns} > d_f+S$ or $d_{ns} < d_f-S$;

where $d_f$ represents the convergence disparity value, S is a predetermined attention value that cooperates with the convergence disparity value to define an attention disparity range in the original disparity map, which may correspond to an attraction region on the display screen that attracts the viewer's attention (i.e., the region which the viewer is looking at, around the convergence position), $d_s$ represents one of the disparity values in the original disparity map that falls within the attention disparity range, $d_{ns}$ represents one of the disparity values in the original disparity map that falls outside of the attention disparity range, $d_{min}^{NT}$ represents the lower limit for the disparity values in the original disparity map, $d_{max}^{NT}$ represents the upper limit for the disparity values in the original disparity map, $A_s$ is a predetermined first transformation value, $A_{ns}$ is a predetermined second transformation value, $T(d_s)$ is a transformation function to transform each of the disparity values in the original disparity map that falls within the attention disparity range into a respective transformed disparity value in the transformed disparity map, and $T(d_{ns})$ is a transformation function to transform each of the disparity values in the original disparity map that falls outside of the attention disparity range into a respective transformed disparity value in the transformed disparity map. It is noted that, based on the above disparity transformation model, the disparity value in the original disparity map that falls within the attention disparity range between $d_f-S$ and $d_f+S$ would be transformed to have relatively strong depth sensation.

In step 205, the processor 14 transforms each of the disparity values in the original disparity map into a respect transformed disparity value based on the disparity transformation model, thereby transforming the original disparity map into the transformed disparity map. Accordingly, through the disparity transformation model, the disparity values that correspond to the pixels falling within the attraction region may be enhanced to achieve stronger 3D illusion, and the disparity values that correspond to the pixels falling outside of the attraction region may be weakened to restrain the 3D illusion. However, the transformed disparity values, whether corresponding to the pixels falling within or outside of the attraction region, would range between the transformation upper limit and the transformation lower limit, thereby providing comfortable 3D viewing experience to the viewer.

In step 206, the processor 14 synthesizes the first image and the second image into the stereoscopic image based on the transformed disparity map.

In summary, according to this disclosure, the processor 14 acquires the convergence disparity value based on the positional information and the original disparity map, and generates the disparity transformation model based on the convergence disparity value and the viewer-related information, so as to perform synthesis of the first image and the second image to generate the stereoscopic image based on the real-time viewing behavior of the viewer.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A stereoscopic imaging method for generating, based on a pair of a first image and a second image that respectively correspond to different viewing angles, a stereoscopic image on a display screen for a viewer, said stereoscopic imaging method comprising:

acquiring viewer-related information that includes a pupil distance between pupils of the viewer, a first parameter associated with a negative disparity condition, and a second parameter associated with a positive disparity condition;

upon receipt of positional information associated with a convergence position on the display screen at which the viewer is looking, acquiring, by a processor based on the positional information, a convergence disparity value from an original disparity map that corresponds to the first and second images, the convergence disparity value corresponding to a pixel of the display screen at the convergence position;

generating a disparity transformation model by the processor based on at least the convergence disparity value and the viewer-related information;

transforming, by the processor, the original disparity map into a transformed disparity map based on the disparity transformation model; and synthesizing, by the processor, the first image and the second image into the stereoscopic image based on the transformed disparity map.

2. The stereoscopic imaging method of claim 1, further comprising:

estimating, by an eye tracking device, the pupil distance of the viewer; and detecting, by the eye tracking device, movements of eyeballs of the viewer to generate the positional information;

wherein the processor acquires the pupil distance from the eye tracking device, acquires the first and second parameters from a storage device, and receives the positional information from the eye tracking device.

3. The stereoscopic imaging method of claim 1, further comprising:

generating, by an input device, the viewer-related information and the positional information in response to an input operation performed thereon;

wherein the processor acquires the viewer-related information and the positional information from the input device.

4. The stereoscopic imaging method of claim 1, further comprising:

measuring, by an eye tracking device, the pupil distance of the viewer; and detecting, by the eye tracking device, movements of eyeballs of the viewer to generate the positional information; and receiving, by an input device, the first and second parameters in response to an input operation performed thereon;

wherein the processor acquires the pupil distance from the eye tracking device, acquires the first and second parameters from the input device, and receives the positional information from the eye tracking device.

5. The stereoscopic imaging method of claim 1, wherein the generating the disparity transformation model includes:

calculating a transformation lower limit of disparity for the transformed disparity map based on the pupil distance, the first parameter, and a pixel density of the display screen;

calculating a transformation upper limit of disparity for the transformed disparity map based on the pupil distance, the second parameter, and the pixel density of the display screen; and generating the disparity transformation model based on the transformation lower limit of disparity, the transformation upper limit of disparity, and the convergence disparity value.

6. The stereoscopic imaging method of claim 5, wherein the transformation lower limit of disparity and the transformation upper limit of disparity are calculated according to:

$$d_{min} = -(D_{eye} \times PPI)/(C_{min}+1); \text{ and}$$

$$d_{max} = (D_{eye} \times PPI)/(C_{max}+1),$$

where $d_{min}$ represents the transformation lower limit of disparity, $d_{max}$ represents the transformation upper limit of disparity, $D_{eye}$ represents the pupil distance, PPI represents the pixel density, $C_{min}$ represents the first parameter, and $C_{max}$ represent the second parameter.

7. The stereoscopic imaging method of claim 6, wherein the disparity transformation model is generated to be $$T(d) = 0.5 \times \{1 + \text{erf}[(d-d_f)/(\sigma\sqrt{2})]\} \times (d_{max} - d_{min}) + d_{min},$$
and $$d_{min}^{NT} < d < d_{max}^{NT},$$

where d represents an arbitrary one of a plurality of disparity values in the original disparity map, $d_{min}^{NT}$ represents a lower limit for the disparity values in the original disparity map, $d_{max}^{NT}$ represents an upper limit for the disparity values in the original disparity map, $d_f$ represents the convergence disparity value, erf[.] represents an error function, $\sigma$ represents a standard deviation of the disparity values in the original disparity map, and T(d) is a transformation function to transform each of the disparity values in the original disparity map into a respective transformed disparity value in the transformed disparity map.

8. The stereoscopic imaging method of claim 6, wherein the disparity transformation model is generated to be $$T(d_s) = A_s \times d_s \times (d_{max} - d_{min})/(d_{max}^{NT} - d_{min}^{NT}) + d_{min},$$
where $$d_f - S < d_s < d_f + S; \text{ and}$$

$$T(d_{ns}) = A_{ns} \times d_{ns} \times (d_{max} - d_{min})/(d_{max}^{NT} - d_{min}^{NT}) + d_{min},$$
where $$d_{ns} > d_f + S \text{ or } d_{ns} < d_f - S;$$

where $d_f$ represents the convergence disparity value, S is a predetermined attention value that cooperates with the convergence disparity value to define an attention disparity range in the original disparity map, $d_s$ represents one of a plurality of disparity values in the original disparity map that falls within the attention disparity range, $d_{ns}$ represents one of the disparity values in the original disparity map that falls outside of the attention disparity range, $d_{min}^{NT}$ represents a lower limit for the disparity values in the original disparity map, $d_{max}^{NT}$ represents an upper limit for the disparity values in the original disparity map, $A_s$ is a predetermined first transformation value, $A_{ns}$ is a predetermined second transformation value, $T(d_s)$ is a transformation function to transform each of the disparity values in the original disparity map that falls within the attention disparity range into a respective transformed disparity value in the transformed disparity map, and $T(d_{ns})$ is a transformation function to transform each of the disparity values in the original disparity map that falls outside of the attention disparity range into a respective transformed disparity value in the transformed disparity map.

9. A stereoscopic imaging device for generating, for a viewer, a stereoscopic image on a display screen that has a plurality of pixels arranged at a pixel density, said stereoscopic imaging device comprising:

a storage device storing a pair of a first image and a second image that respectively correspond to different viewing angles, an original disparity map that corresponds to the first and second images and that has a plurality of disparity values respectively corresponding to the pixels of the display screen, and information of the pixel density of the display screen; and a processor coupled to said storage device for acquiring therefrom the first image, the second image, the original disparity map, and the information of the pixel density of the display screen, disposed to receive positional information associated with a convergence position on the display screen at which the viewer is looking, and viewer-related information that includes a pupil distance between pupils of the viewer, a first parameter associated with a negative disparity condition, and a second parameter associated with a positive disparity condition, and configured to acquire, upon receipt of the positional information, a convergence disparity value from the original disparity map based on the positional information and the original disparity map, the convergence disparity value being one of the disparity values that corresponds to one of the pixels of the display screen at the convergence position, to generate a disparity transformation model based on at least the convergence disparity value and the viewer-related information, to transform the original disparity map into a transformed disparity map based on the disparity transformation model, and to synthesize the first image and the second image into the stereoscopic image based on the transformed disparity map.

10. The stereoscopic imaging device of claim 9, further comprising an eye tracking device coupled to said processor, and configured to estimate the pupil distance of the viewer, and to detect movements of eyeballs of the viewer to generate the positional information;
wherein said storage device further stores the first parameter and the second parameter;
wherein said processor is further configured to acquire the pupil distance and the positional information from said eye tracking device, and to acquire the first and second parameters from said storage device.

11. The stereoscopic imaging device of claim 9, further comprising an input device coupled to said processor, and configured to generate the viewer-related information and the positional information in response to an input operation performed thereon;
wherein said processor acquires the viewer-related information and the positional information from said input device.

12. The stereoscopic imaging device of claim 9, further comprising:
an eye tracking device coupled to said processor, and configured to measure the pupil distance of the viewer, and to detect movements of eyeballs of the viewer to generate the positional information; and
an input device coupled to said processor, and configured to generate the first parameter and the second parameter in response to an input operation performed thereon;
wherein said processor is configured to acquire the pupil distance from said eye tracking device, and to acquire the first and second parameters from said input device, and receives the positional information from said eye tracking device.

13. The stereoscopic imaging device of claim 9, wherein said processor is further configured
to calculate a transformation lower limit of disparity for the transformed disparity map based on the pupil distance, the first parameter, and the pixel density of the display screen;

to calculate a transformation upper limit of disparity for the transformed disparity map based on the pupil distance, the second parameter, and the pixel density of the display screen; and
to generate the disparity transformation model based on the transformation lower limit of disparity, the transformation upper limit of disparity, and the convergence disparity value.

14. The stereoscopic imaging device of claim 13, wherein the transformation lower limit of disparity and the transformation upper limit of disparity are calculated according to:

$$d_{min}=-(D_{eye} \times PPI)/(C_{min}+1); \text{ and}$$

$$d_{max}=(D_{eye} \times PPI)/(C_{max}+1),$$

where $d_{min}$ represents the transformation lower limit of disparity, $d_{max}$ represents the transformation upper limit of disparity, $D_{eye}$ represents the pupil distance, PPI represents the pixel density, $C_{min}$ represents the first parameter, and $C_{max}$ represent the second parameter.

15. The stereoscopic imaging device of claim 14, wherein the disparity transformation model is generated to be $$T(d)=0.5 \times \{1+\text{erf}[(d-d_f)/(\sigma\sqrt{2})]\} \times (d_{max}-d_{min})+d_{min},$$
and $$d_{min}^{NT}<d<d_{max}^{NT},$$

where d represents an arbitrary one of the disparity values in the original disparity map, $d_{min}^{NT}$ represents a lower limit for the disparity values in the original disparity map, $d_{max}^{NT}$ represents an upper limit for the disparity values in the original disparity map, $d_f$ represents the convergence disparity value, erf[.] represents an error function, σ represents a standard deviation of the disparity values in the original disparity map, and T(d) is a transformation function to transform each of the disparity values in the original disparity map into a respective transformed disparity value in the transformed disparity map.

16. The stereoscopic imaging device of claim 14, wherein the disparity transformation model is generated to be $$T(d_s)=A_s \times d_s \times (d_{max}-d_{min})/(d_{max}^{NT}-d_{min}^{NT})+d_{min},$$
where $$d_f-S<d_s<d_f+S; \text{ and}$$

$$T(d_{ns})=A_{ns} \times d_{ns} \times (d_{max}-d_{min})/(d_{max}^{NT}-d_{min}^{NT})+d_{min},$$
where $$d_{ns}>d_f+S \text{ or } d_{ns}<d_f-S;$$

where $d_f$ represents the convergence disparity value, S is a predetermined attention value that cooperates with the convergence disparity value to define an attention disparity range in the original disparity map, $d_s$ represents one of the disparity values in the original disparity map that falls within the attention disparity range, $d_{ns}$ represents one of the disparity values in the original disparity map that falls outside of the attention disparity range, $d_{min}^{NT}$ represents a lower limit for the disparity values in the original disparity map, $d_{max}^{NT}$ represents an upper limit for the disparity values in the original disparity map, $A_s$ is a predetermined first transformation value, $A_{ns}$ is a predetermined second transformation value, $T(d_s)$ is a transformation function to transform each of the disparity values in the original disparity map that falls within the attention disparity range into a respective transformed disparity value in the transformed disparity map, and $T(d_{ns})$ is a transformation function to transform each of the disparity values in the original disparity map that falls outside of the attention disparity range into a respective transformed disparity value in the transformed disparity map.

\* \* \* \* \*